(12) United States Patent
Rimnac

(10) Patent No.: US 6,460,522 B1
(45) Date of Patent: Oct. 8, 2002

(54) METHOD AND APPARATUS FOR CONTROLLING ENGINE EXHAUST GAS RECIRCULATION

(75) Inventor: Phillip F. Rimnac, Saline, MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 09/738,091

(22) Filed: Dec. 15, 2000

(51) Int. Cl.[7] .............................................. F02D 21/08
(52) U.S. Cl. ................................. 123/568.24; 60/605.2
(58) Field of Search ....................... 123/568.23, 568.24; 60/605.2

(56) References Cited

U.S. PATENT DOCUMENTS

| | | | | | |
|---|---|---|---|---|---|
| 3,915,184 A | * | 10/1975 | Young et al. | ........... | 123/568.24 |
| 4,300,515 A | * | 11/1981 | Strubel et al. | ......... | 123/568.23 |
| 5,503,131 A | * | 4/1996 | Ohuchi | ................... | 123/568.24 |
| 5,619,974 A | * | 4/1997 | Rodefeld et al. | ....... | 123/568.23 |
| 6,026,790 A | | 2/2000 | Itoyama | | |
| 6,098,602 A | * | 8/2000 | Martin et al. | ........... | 123/568.23 |
| 6,182,645 B1 | * | 2/2001 | Tsuchiya | ................ | 123/568.23 |
| 6,314,735 B1 | * | 11/2001 | Kolmanovsky et al. | .... | 60/605.2 |

* cited by examiner

Primary Examiner—Paul J. Hirsch
(74) Attorney, Agent, or Firm—Brooks & Kushman P.C.

(57) ABSTRACT

The present invention provides a method and apparatus for controlling an internal combustion engine. The engine includes a variable flow exhaust gas recirculation (EGR) system. The method includes providing a variable geometry turbocharger (VGT) in communication with the EGR system for controlling exhaust gas recirculation. The geometry of the VGT is varied by adjustably controlling a rotary electric actuator (REA) operatively connected to the VGT. A position-adjustable proportional flow EGR valve is adjusted by adjustably controlling a second rotary electric actuator (REA) operatively connected to the position-adjustable proportional flow valve.

5 Claims, 2 Drawing Sheets

METHOD AND APPARATUS FOR CONTROLLING ENGINE EXHAUST GAS RECIRCULATION

TECHNICAL FIELD

The present invention relates to a method and apparatus which implements a rotary electric actuator for controlling a variable geometry turbocharger, and includes a second rotary electric actuator for controlling an exhaust gas recirculation valve in an exhaust gas recirculation system for an engine.

BACKGROUND ART

Much public literature describes the use of alternative charge air handling in turbocharging concepts to drive and control cooled EGR (exhaust gas recirculation), as a primary means for $NO_x$ reduction in automotive and truck engines. One of the more popular approaches is to use a single stage VGT (variable geometry turbocharger), in combination with an EGR (exhaust gas recirculation) circuit to achieve the desired ratio of EGR rate and fresh air/fuel ratio, under both transient and steady state operations. In a typical arrangement, the EGR circuit includes a valve, cooler, and tubing connecting the exhaust side of the engine (manifold or turbine) with the intake side of the engine (intake manifold or intake piping). The EGR valve may be an on/off or modulating (proportional) type valve to regulate EGR flow, and it may be mounted on the turbine, exhaust manifold, between the exhaust manifold and cooler, or on the downstream (cool) side of the EGR cooler. Other derivatives of this common arrangement may include a mixing device at the point of EGR gas entry to the inlet manifold and/or a venturi device to encourage a negative pressure differential across the engine as required to drive EGR flow from the exhaust side to the intake side of the engine.

In many diesel engines, particularly larger engines under low speed and moderate-to-high load operation, the turbocharger match is relatively efficient. Therefore, intake side (compressor-out) pressure (or boost) levels usually exceed exhaust side (turbine-in) pressure (or boost) and a so-called positive pressure differential exists across the engine under a wide range of steady state or near steady state operating conditions. To drive EGR from the exhaust to the intake side of the engine, a negative pressure differential (exhaust pressure greater than intake pressure) must be imposed on all or part of the engine gas flow. In many proposed EGR arrangements, the VGT performs the primary role of reversing the pressure differential across the engine. However, during the breathing portion of the four stroke cycle, engine pumping parasitics and BSFC (brake specific fuel consumption) are increased. As the turbine vanes of the VGT are moved to a more closed position, turbine and compressor wheel speeds increase, as do overall boost levels. Depending on the contour of the turbine and the compressor efficiency maps versus flow and boost, turbine and compressor efficiencies will eventually begin to deteriorate as wheel speeds and boost increase. Turbine-in pressure will ultimately exceed compressor-out pressure, thereby creating the necessary overall negative pressure differential across the engine, conducive for EGR to flow from the exhaust manifold to the intake manifold. Manifold gas dynamics and associated pressure pulses will enable some amount of EGR to begin to flow, even though the cycle average to pressure differential across the engine is slightly positive. This is the subject of many proposed EGR configurations. If large EGR flow rate percentages are required, the cycle average pressure differential will also become negative.

Under most scenarios involving EGR, EGR gas displaces some of the fresh, boosted air normally ingested into the engine. To preserve reasonable air/fuel ratios for combustion efficiency and completeness while accommodating EGR in a given engine displacement, fresh air intake charge density must be increased accordingly. This can be achieved via higher boost levels, and to a lesser degree, by improved charge air cooling. Hence, the moving of VGT vanes to a more closed position (relative to non-EGR operation) simultaneously achieves the requirement of higher fresh air boost levels required to maintain adequate fresh air/fuel ratios (and oxygen content) for efficient combustion and low particulate emissions.

Boost levels must be increased relative to the non-EGR operation in order to preserve air/fuel ratios, unless the combustion system has been developed to achieve performance and emissions objectives under lower brake specific air consumption (BSAC) rates.

For a given engine, a desired engine rating or torque curve can be described by the relationship of torque and horsepower at a specific engine speed. To produce the desired engine torque curve while using EGR to reduce the level of $NO_x$, the degree of VGT vane position changes for a given speed and load (i.e. torque). The degree of vane closure required to drive the necessary amount of VGR can be characterized as a function of the required negative pressure differential across the engine versus engine speed. One consequence of using a VGT to drive EGR is that the sensitivity of vane position and its associated $NO_x$ level changes with the required negative pressure differential across the engine. The vane position sensitivity to $NO_x$ typically increases with lower engine speeds.

Under many operating conditions, adequate air/fuel ratios can be achieved with operating the EGR valve in a full open position and setting the VGT vane position as required to provide the necessary negative pressure differential across the engine to provide the desired amount of EGR flow. However, under certain operation conditions, the proper EGR rate and air/fuel ratio cannot be achieved with a fully open EGR valve.

In the past, VGT position and EGR valve position have been controlled by pneumatic actuators. However, this type of control is insufficient to achieve accurate EGR control under all modes of normal and regulated operation, and over the life of the engine.

DISCLOSURE OF INVENTION

The present invention overcomes the above-referenced shortcomings of prior art EGR systems by providing a rotary electric actuator (REA) operatively connected to the variable geometry turbocharger (VGT) for controlling exhaust gas recirculation. In a preferred embodiment, a second rotary electric actuator is operatively connected to the position-adjustable proportional EGR valve for further EGR control.

More specifically, the present invention provides a method of controlling an internal combustion engine, wherein the engine includes a variable flow exhaust gas recirculation (EGR) system. The method includes: a) providing a variable geometry turbocharger (VGT) in communication with the EGR system for controlling exhaust gas recirculation; and b) varying the geometry of the VGT by adjustably controlling a rotary electric actuator (REA) which is operatively connected to the VGT.

In a preferred embodiment, the method further includes providing a position-adjustable proportional flow EGR valve as part of the EGR system, and varying the position of the proportional flow EGR valve by adjustably controlling a second rotary electric actuator (REA) operatively connected to the position-adjustable proportional flow EGR valve.

Another aspect of the invention contemplates an engine including an intake manifold and a variable geometry turbocharger (VGT) operatively connected to the intake manifold. An exhaust gas recirculation (EGR) system is provided in communication with the intake manifold, and includes a position-adjustable proportional flow EGR valve. A first rotary electric actuator (REA) is operatively connected to the VGT for controlling recirculation of exhaust gases. A second rotary electric actuator (REA) is operatively connected to the EGR valve to enhance the control of recirculation of exhaust gases.

Accordingly, an object of the invention is to provide an improved method and apparatus for controlling exhaust gas recirculation by providing a rotary electric actuator (REA) to adjustably control a variable geometry turbocharger (VGT).

A further object of the invention is to provide first and second rotary electric actuators to control a variable geometry turbocharger (VGT) and a proportional flow EGR valve, respectively, in an engine exhaust gas recirculation (EGR) system.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
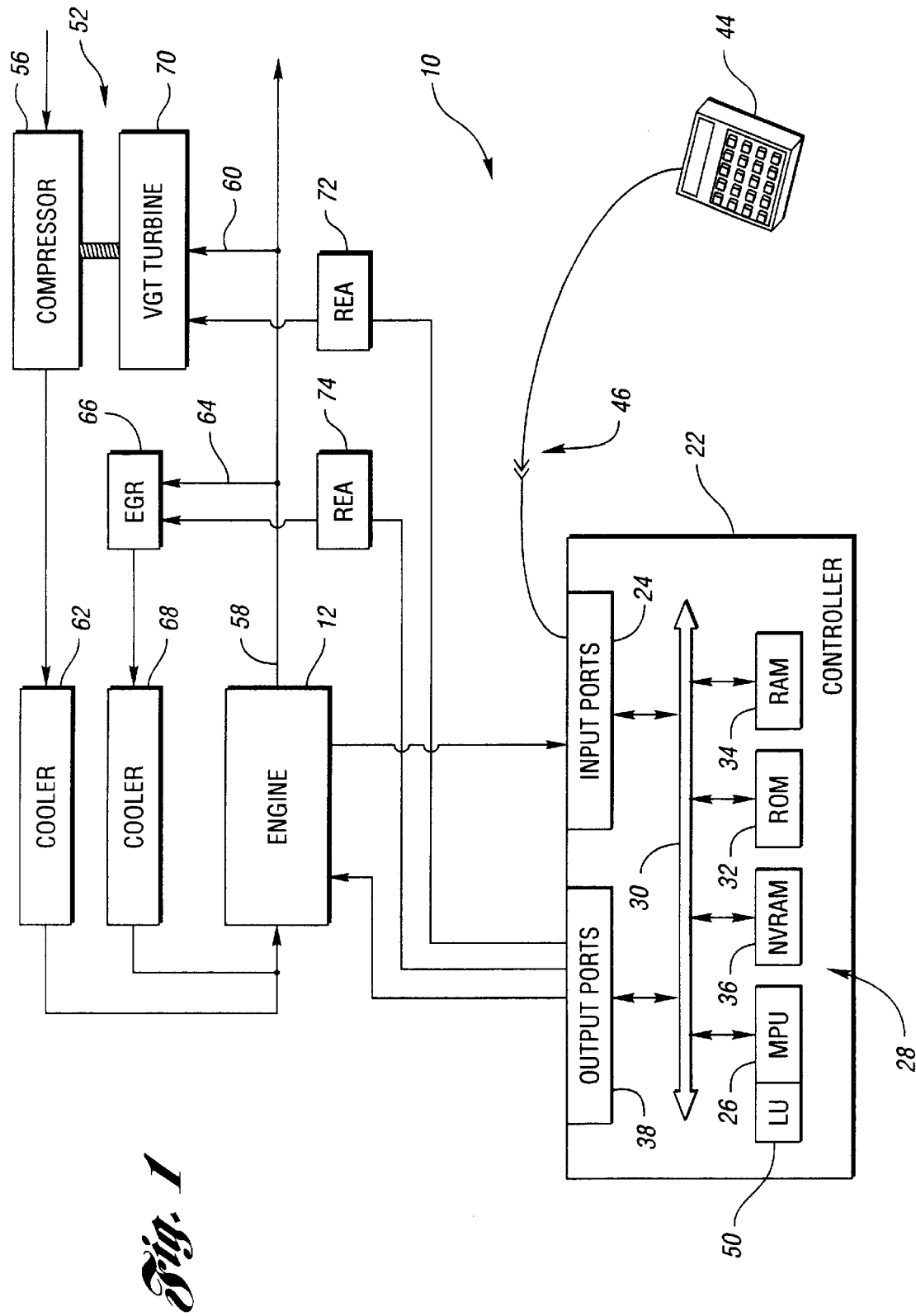
FIG. 1 is a schematic diagram of an internal combustion engine and engine control system in accordance with the present invention.

With reference to FIG. 1, an internal combustion engine and associated control systems and subsystems are generally indicated at 10. System 10 includes an engine 12 having a plurality of cylinders, each fed by a fuel injector. In a preferred embodiment, the engine 12 is a compression-ignition internal combustion engine, such as a heavy duty diesel fuel engine. The injectors receive pressurized fuel from a fuel supply in a known manner.

Various sensors are provided in electrical communication with a controller 22 via input ports 24. Controller 22 preferably includes a microprocessor 26 in communication with various computer readable storage media 28 via data and control bus 30. Computer readable storage media 28 may include any of a number of known devices which function as read only memory 32, random access memory 34, and non-volatile random access memory 36.

Computer readable storage media 28 have instructions stored thereon that are executable by controller 22 to perform methods of controlling the internal combustion engine, including variable flow exhaust gas recirculation (EGR) valve 66 and variable geometry turbocharger 52. The program instructions direct controller 22 to control the various systems and subsystems of the vehicle, with the instructions being executed by microprocessor 26, and optionally, instructions may also be executed by any number of logic units 50. Input ports 24 receive signals from various sensors, and controller 22 generates signals at output ports 38 that are directed to the various vehicle components.

A data, diagnostics, and programming interface 44 may also be selectively connected to controller 22 via a plug 46 to exchange various information therebetween. Interface 44 may be used to change values within the computer readable storage media 28, such as configuration settings, calibration variables, instructions for EGR and VGT control, and others.

In operation, controller 22 receives signals from the various vehicle sensors and executes control logic embedded in hardware and/or software to control the engine. In a preferred embodiment, controller 22 is a DDEC controller available from Detroit Diesel Corporation of Detroit, Mich. Various other features of this controller are described in detail in a number of different U.S. patents assigned to Detroit Diesel Corporation. Supporting background information may be found in U.S. patent application Ser. No. 09/540,017, which is assigned to the assignee of the present application, and is hereby incorporated by reference in its entirety.

As is appreciated by one of ordinary skill in the art, control logic may be implemented in hardware, firmware, software, or combinations thereof. Further, control logic may be executed by controller 22, in addition to by any of the various systems and subsystems of the vehicle cooperating with the controller 22. Further, although in a preferred embodiment, controller 22 includes microprocessor 26, any of a number of known programming and processing techniques or strategies may be used to control an engine in accordance with the present invention.

Further, it is to be appreciated that the engine controller may receive information in a variety of ways. For example, engine systems information could be received over a data link, at a digital input or at a sensor input of the engine controller.

With continuing reference to FIG. 1, controller 22 provides enhanced engine performance by controlling a variable flow exhaust gas recirculation valve 66 and by controlling a variable geometry turbocharger 52. Variable geometry turbocharger 52 includes a turbine 54 and a compressor 56. The pressure of the engine exhaust gases causes the turbine to spin. The turbine drives the compressor, which is typically mounted on the same shaft. The spinning compressor creates turbo boost pressure which develops increased power during combustion.

A variable geometry turbocharger has movable components in addition to the rotor group. These movable components can change the turbocharger geometry by changing the area or areas in the turbine stage through which exhaust gases from the engine flow, and/or changing the angle at which the exhaust gases enter or leave the turbine. Depending upon the turbocharger geometry, the turbocharger supplies varying amounts of turbo boost pressure to the engine. The variable geometry turbocharger may be electronically controlled to vary the amount of turbo boost pressure based on various operating conditions.

In a variable geometry turbocharger, the turbine housing is oversized for an engine, and the air flow is choked down to the desired level. There are several designs for the variable geometry turbocharger. In one design, a variable inlet nozzle has a cascade of movable vanes which are pivotable to change the area and angle at which the air flow enters the turbine wheel. In another design, the turbocharger has a movable side wall which varies the effective cross-sectional area of the turbine housing. It is appreciated that embodiments of the present invention are not limited to any particular structure for the variable geometry turbocharger. That is, the term VGT as used herein means any controllable air pressurizing device including the above examples, and including a modulated waste gate valve.

An exhaust gas recirculation system introduces a metered portion of the exhaust gases into the intake manifold. The EGR system dilutes the incoming fuel charge and lowers combustion temperatures to reduce the level of oxides of nitrogen. The amount of exhaust gas to be recirculated is controlled by EGR valve 66 and VGT. It is appreciated that there are many possible configurations for a controllable EGR valve, and embodiments of the present invention are not limited to any particular structure for the EGR valve. Further, it is appreciated that various sensors of the EGR valve may detect temperature and differential pressure to allow the engine control to determine the mass flow rate through the valve. In addition, it is appreciated that various different sensor configurations may be utilized in various parts of the engine flow paths to allow controller 22 to determine the various mass flow rates throughout the exhaust system, including flow through the EGR system and flow through the compressor, and any other flows.

It may be desirable to provide a cooler 62 to cool the charge air coming from compressor 56. Similarly, it may be desirable to provide a cooler 68 to cool the flow through the EGR system prior to reintroduction of the gases into the engine 12.

The present invention is particularly useful in improving emissions in heavy duty diesel engines. Using EGR technology to mix a portion of exhaust gas with the intake charge reduces emissions of oxides of nitrogen ($NO_x$), while minimizing fuel economy impact and improving durability. In a turbocharged diesel engine, the back pressure necessary to drive the EGR flow from exhaust to intake manifolds is accomplished with the variable geometry turbocharger 70. The control of the EGR flow rate may be achieved via VGT geometry change (for example, vane position change), via EGR valve position change, and preferably via both.

The present invention is particularly characterized by its use of a rotary electric actuator (REA) 72 to control the vane position of the VGT turbine 70 as the primary device to drive the flow of EGR. Another feature of the invention is the second rotary electric actuator (REA) 74, which modulates the proportional EGR valve 66 position. The dual REA's primary function is to provide high resolution, incremental changes in VGT vane and EGR valve position as required to accurately meter desired quantities of EGR across the engine while providing adequate air/fuel ratio to meet $NO_x$ and PM emission requirements. A secondary function of the VGT REA is to provide fast response time and high resolution, incremental changes in VGT vane position as required for enhanced engine performance, drivability and engine braking. A tertiary function of the VGT REA in conjunction with a turbocharger wheel speed sensor would be to provide turbocharger overspeed protection to enhance and predict turbocharger fatigue life.

The REA 72 on the VGT 70 provides accurate control of the VGT vane position. Similarly, the REA 74 on the EGR 66 provides accurate valve modulation to achieve adequate air/fuel ratios under transient and steady state operation to meet emissions requirements. In a preferred embodiment, REA 72 is a model #17202015, and REA 74 is model #17202025, both available from Delphi Corporation of Rochester, N.Y.

Figure 2:
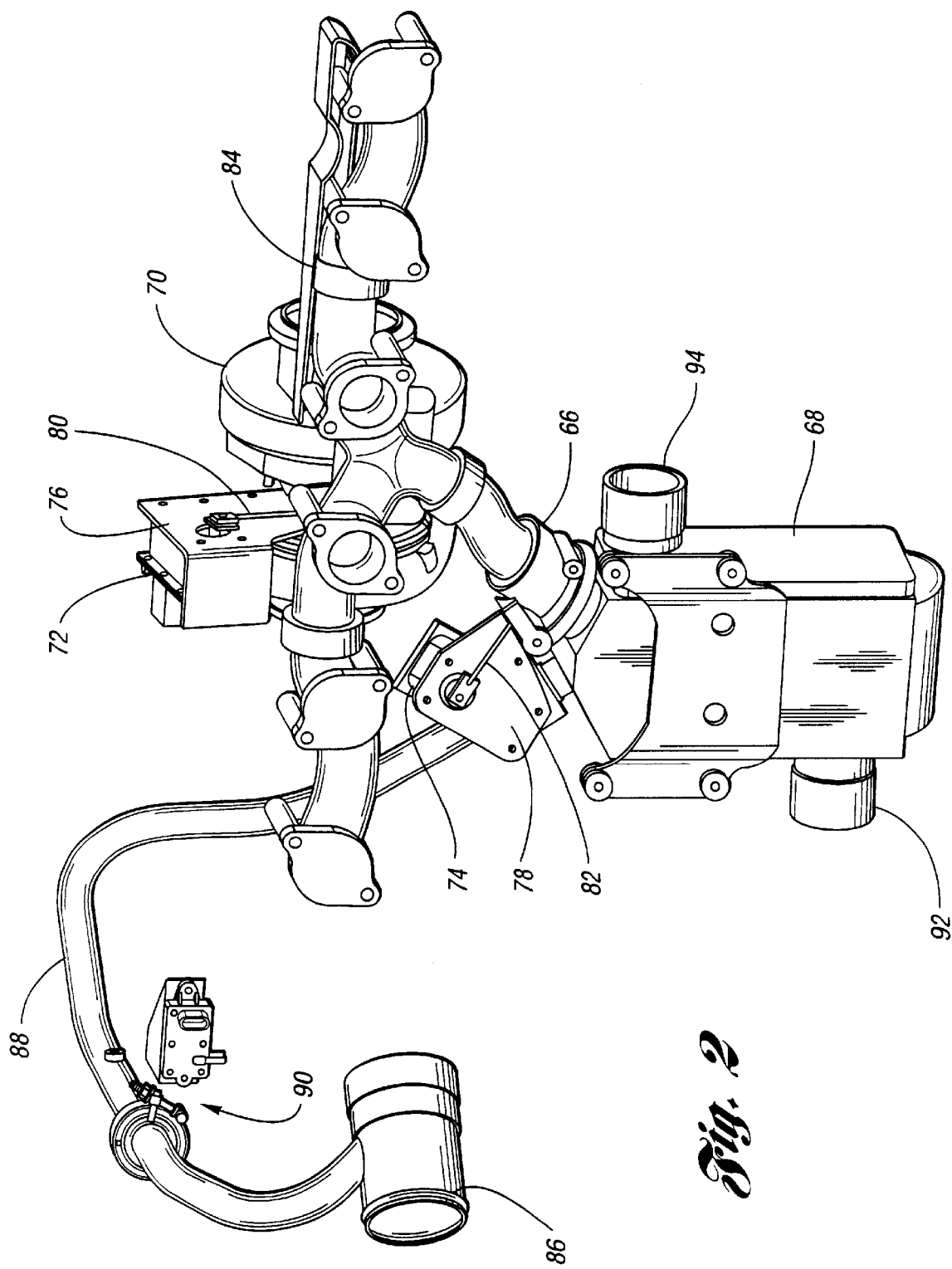
FIG. 2 is a perspective view of an exhaust gas recirculation system and variable geometry turbocharger in accordance with the present invention.

As shown in FIG. 2, the REAs 72,74 will be mounted to the VGT 70 and EGR 66 via brackets 76,78, respectively. The brackets 76,78 would serve in part as a heat shield for the REAs 72,74, as well as providing rigid support. A linkage 80,82 would connect the REAs 72,74, respectively, to the vane position lever arm on the VGT 70 and a valve position lever arm on the EGR valve 66. The linkages would have adjustment capability for calibrating VGT vane and EGR valve travel. Some techniques such as a locking nut may be used on the linkage to prevent tampering. Several VGT mounting brackets could be provided to address vehicle packaging and installation issues.

The VGT and EGR valve REAs would be controlled by the engine controller 22. The control could be in the form of a pulsewidth modulated (PWM) signal or by a signal broadcasted over the SAE-J 1939 or proprietary engine CAN data link. The REAs would support some level of automatic VGT vane and EGR valve travel calibration. This could include automatic vane and valve travel range calibration at the full open and closed positions. The automatic calibration would likely occur under engine start up conditions. Self-diagnostics could be communicated across the CAN link.

The onboard controller 22 would provide closed loop actuator position control. A contactless position sensor and brushless DC motor would be desired. The application of two REAs (one for the VGT and one for the EGR valve) would be optimized by packaging the primary microprocessor control hardware for both REAs in a mother REA, for example on the VGT, and controlling the second REA on the EGR valve by a wire harness connection to a less-costly onboard circuit board.

In addition to showing the overall system structure and linkages 80,28, FIG. 2 further illustrates the exhaust manifold 84, intake manifold 86, EGR system tubing 88, EGR flow rate measurement device 90, as well as the inlet 92 and outlet 94 for water flowing through the cooler 68.

While the best mode for carrying out the invention has been described in detail, those familiar with the art to which this invention relates will recognize various alternative designs and embodiments for practicing the invention within the scope of the appended claims.

What is claimed is:

1. A method of controlling an internal combustion engine, the engine including a variable flow exhaust gas recirculation (EGR) system, the method comprising:
    a) providing a variable geometry turbocharger (VGT) in communication with the EGR system for controlling exhaust gas recirculation; and
    b) varying the geometry of the VGT by adjustably controlling a rotary electric actuator (REA) operatively connected to the VGT.

2. The method of claim 1, further comprising a position-adjustable proportional flow EGR valve as part of the EGR system, and varying the position of the proportional flow EGR valve by adjustably controlling a second rotary electric actuator (REA) operatively connected to the position-adjustable proportional flow EGR valve.

3. An engine comprising:
    an intake manifold;
    an exhaust gas recirculation (EGR) system in communication with the intake manifold and including a position-adjustable proportional flow EGR valve and a variable geometry turbocharger (VGT);
    a first rotary electric actuator (REA) operatively connected to the VGT for controlling recirculation of exhaust gases; and
    a second rotary electric actuator (REA) operatively connected to the EGR valve to enhance said controlling of recirculation of exhaust gases.

4. The method of claim 3, further comprising a first linkage connecting the first REA to the VGT and a second linkage connecting the second REA to the EGR valve.

5. A method of controlling an internal combustion engine, the engine including a variable flow exhaust gas recirculation (EGR) system with a position-adjustable proportional flow EGR valve and a variable geometry turbocharger (VGT) for controlling exhaust gas recirculation, the method comprising:

a) varying the geometry of the VGT by adjustably controlling a rotary electric actuator (REA) operatively connected to the VGT; and b) varying the position of the proportional flow EGR valve by adjustably controlling a second rotary electric actuator (REA) operatively connected to the position-adjustable proportional flow EGR valve.

* * * * *